United States Patent
Schrive et al.

(10) Patent No.: US 7,381,328 B2
(45) Date of Patent: Jun. 3, 2008

(54) EFFLUENT TREATMENT COMBINING SOLID/LIQUID SEPARATION AND PULSED ELECTRIC FIELDS

(75) Inventors: Luc Schrive, Pont Saint Esprit (FR); Philip Nouvel, Sauzet (FR); Alain Grasmick, Montferrier-sur-Lez (FR)

(73) Assignee: Commissart A l'Energie Atomique, Paris (FR)

( * ) Notice: Subject to any disclaimer, the term of this patent is extended or adjusted under 35 U.S.C. 154(b) by 0 days.

(21) Appl. No.: 10/517,775

(22) PCT Filed: Jul. 2, 2003

(86) PCT No.: PCT/FR03/02055

§ 371 (c)(1),
(2), (4) Date: Dec. 27, 2004

(87) PCT Pub. No.: WO2004/005197

PCT Pub. Date: Jan. 15, 2004

(65) Prior Publication Data

US 2005/0211638 A1    Sep. 29, 2005

(30) Foreign Application Priority Data

Jul. 5, 2002 (FR) .................................. 02 08455

(51) Int. Cl.
*C02F 1/48* (2006.01)
(52) U.S. Cl. .................... 210/243; 210/321.6; 204/665; 422/186.28
(58) Field of Classification Search ............... 210/243, 210/748, 321.6; 204/600, 665; 422/22, 422/186.04, 186.21, 186.28
See application file for complete search history.

(56) References Cited

U.S. PATENT DOCUMENTS

| | | | |
|---|---|---|---|
| 3,192,142 A | 6/1965 | Vellas et al. | |
| 3,480,529 A | 11/1969 | Waltrip | |
| 3,933,606 A | 1/1976 | Harms | |
| 4,169,029 A | 9/1979 | Smirnov et al. | |
| 5,447,733 A * | 9/1995 | Bushnell et al. | 426/237 |
| 6,030,538 A * | 2/2000 | Held | 210/748 |
| 6,491,820 B2 * | 12/2002 | Held et al. | 210/609 |
| 6,521,134 B1 * | 2/2003 | Banerjee et al. | 210/748 |
| 2002/0056634 A1 | 5/2002 | Pitts, Jr. et al. | |

FOREIGN PATENT DOCUMENTS

DE    41 00 799    7/1992

(Continued)

*Primary Examiner*—Matthew O. Savage
(74) *Attorney, Agent, or Firm*—Oblon, Spivak, McClelland, Maier & Neistadt, P.C.

(57) ABSTRACT

The treatment of effluents in which a flow of the effluents is subjected to a pulsed electric field that modifies physico-chemical and biologic characteristics of the medium, this modification being used during a solid/liquid separation operation, of the settlement or membrane filtration type. The solid/liquid separation operation and the application of a pulsed electric field are operations carried out at different locations along the effluent flow. The pulsed electric field has voltage value, current value, pulse repetition frequency, and voltage front shape characteristics chosen such that the required effluent treatment can be achieved as a function of the locations at which these membrane filtration operations are carried out and a pulsed electric field is applied.

6 Claims, 3 Drawing Sheets

FOREIGN PATENT DOCUMENTS

| | | |
|---|---|---|
| DE | 197 52 371 | 6/1998 |
| DE | 100 50 489 | 7/2001 |
| FR | 2 784 979 | 4/2000 |
| GB | 2 149 423 | 6/1985 |
| WO | 97 17297 | 5/1997 |
| WO | 02 04356 | 1/2002 |

* cited by examiner

EFFLUENT TREATMENT COMBINING SOLID/LIQUID SEPARATION AND PULSED ELECTRIC FIELDS

TECHNICAL DOMAIN

This invention relates to a method and installation for the treatment of effluents using pulsed electric fields, the effect of which is a physicochemical and biological modification of an aqueous medium, used in membrane filtration.

Water needs in France (water for human consumption, industrial water, water for agriculture purposes) accounts for 700 m$^3$/year and per inhabitant. Human consumption is of the order of 300 l/day and per inhabitant. Water needs for a town require treatment on the upstream and downstream sides.

Consequently, water management is a very important activity at the moment, at three different levels:

the upstream resource, water treatment before use, much of which relates to human consumption (which can be referred to as "drinking water treatment" for simplification purposes);

treatment of releases into the environment. Conventionally, these are aqueous releases from treatment plants and residual sludge. More broadly, this treatment includes water treatment before reuse (or tertiary treatments), often for agricultural or industrial purposes.

Since water is the solvent of life, natural organisms proliferate in it. Some of these are pathogenic (bacteria, yeast, parasites), or will contain pathogenic organisms (amoeba) or will enable viruses to develop in host cells.

In some cases, metabolic compounds of microorganisms may be pathogenic (toxins of cyanobacteria).

In other cases, natural chemical compounds (nitrogen derivatives) and anthropic compounds (arsenic, mercury, insecticide residues, antibiotic residues) may be the source of health problems.

These compounds have different sizes and have different compositions. Sizes may vary from a few millimetres for some parasites (Ascaris lumbricoides, anguillula intestinalis), of the order of a few tens of micrometers for their eggs or amoeba (50 μm), a few micrometers for bacteria and fungi (0.3 μm for the smallest dimension of pseudomona diminuta), a few nanometers for viruses (25 nm for the poliomyelitis virus) and of the order of one nm for the smallest dissolved compounds. Microorganisms may be in sporulated form, strongly resistant to external aggression. The pathogenicity due to biological organisms (unlike chemical compounds) occupies an important place particularly due to the after growth aspect of most bacteria. This aspect is particularly important when it concerns immuno-deficient subjects, with species such as protozoan cysts such as *Cryptosporidium parvum*.

In order to facilitate understanding of this document, the reader is informed about the risk of confusion between the biomembrane of a microorganism and the separating membrane of the filtration method. The first term explicitly refers to the plasma membrane composed of a double lipidic layer. The second term will be qualified as a "process" membrane, or a filtration membrane, or a filter membrane, or simply as "membrane/PEF coupling" without any further clarification.

STATE OF PRIOR ART

Conventional water treatments cover all flows of drinking water, wastewater and sludge derived from conventional treatments so as to respect promulgated standards.

Chronologically, the objectives are to eliminate the particulate fraction (compounds larger than one micrometer), the colloidal fraction (a few tens of nanometres), and then the soluble fraction. These steps involve the following in sequence:

preliminary treatments (screening, desanding, deoiling, sieving), clarification treatments (coagulation, flocculation, flotation), disinfection (chemical or physical), finishing treatments (elimination of micro-pollutants by oxidation, absorption on active carbon, nanofiltration, etc.).

The normal drinking water treatment is composed of physical treatments (screening, sand filtration, etc.), physicochemical treatments (coagulation, flocculation), completed by a finishing step, the purpose of which is to avoid after growth of macro-organisms or the elimination of soluble organic molecules; chlorination, ozonation, oxidation by hydrogen peroxide, ultraviolet radiation, nanofiltration, adsorption on active carbon.

One emerging trend facilitates total separative treatment (by reverse osmosis) to obtain perfectly purified water, and finally to reconstitute a food quality water by the addition of salts and trace elements. This is the case of "bottled water" techniques, for which the demand is growing strongly both in developed countries (for taste "comfort" reasons) and in developing countries (for microbiological health reasons).

For wastewater, the essential purpose of the techniques involved is to obtain a concentration of pathogenic compounds, suspended solids and soluble compounds compatible with the receiving medium. In practice, techniques involved enable a reduction in the chemical oxygen demand (COD) such that the residual COD is less than 80 to 100 mgL$^{-1}$, or a reduction in the biological oxygen demand (BOD) such that the BOD$_5$ is less than 20 mgL$^{-1}$.

The most conventional techniques are aerobic biological treatments (final oxidation of dissolved compounds, for example of the glucidic type in $CO_2$ and $H_2O$ form) and anaerobic biological treatments (fermentation in the absence of oxygen, for which the final stage is release of methane). In both cases, the technique is a method for degradation of organic material by a bacterial biomass involving oxidation—reduction reactions catalysed by specific enzymes.

The bacteriological quality of residual water subjected to a tertiary treatment is normally less stringently controlled than for drinking water, due to the fact that this water will not be ingested directly. Nevertheless, considering that this water could be reused, the rules are becoming stringent, like "title 22" in California (22 coliforms per litre are tolerated in water reuseable for agriculture) and the methods involved are increasingly similar to methods used for drinking water treatment.

In the domain of sludge, 22 kilograms of dry matter are produced annually per equivalent inhabitant (which means more than a million tonnes per year in France), derived from the treatment of residual urban or industrial water. Originally, sludges are an extremely liquid suspension, with a content of dry matter equal to 0.5 to 5%. This sludge may be hydrophilic (which is usually the case) or hydrophobic, with physical or biological origin depending on the treatment from which they are derived.

Globally, sludge contains mineral material, organic material originating from cellular catabolism, and parasite pathogenic organisms (bacteria, helminth eggs). The difficulty is to produce stabilised sludges (15 to 30% dryness, non fermentable) and hygienised (the concentration of pathogenic organisms is reduced to very low levels respecting standards issued by the Ministry of Health, particularly for salmonella, helminth eggs and enteroviruses).

When the initial effluent contains a large quantity of colloids and suspended solids, a physical coagulation treatment is used. Eventually, the sludge content is increased (compared with the entering material) due to the addition of coagulation additives; specific polymers, trivalent metals (Al, Fe) in the form of hydroxides or chlorides.

When the majority of the material is dissolved, biological treatment is preferred. The treated sludges then contain biological residues but a large proportion of the entering content is oxidised in the form of water and gas. The sludge quantity is usually less than the entering content. On average (average or high entering content, for a residual BOD of 25 to 40 $mgL^{-1}$), the sludge production is ½ or ⅓ of the entering BOD mass expressed in kg $BOD_5/m^3d$. But this strongly depends on the global performances of the treatment, particularly progress with enzyme exocellular hydrolysis reactions that enable maximum possible assimilation of compounds dissolved by enzyme endocellular reactions.

Energy consumption and additives consumption (physicochemical treatments) parameters are essential to evaluate the advantages and the disadvantages of the various technologies. Furthermore, the efficiency of the different techniques needs to be compared (for example microbial reduction) taking account of incidental risks related to the use of a particular technique (for example failure of a chlorometre or breakage of a filtration membrane) or considering undesirable by-products (chlorinated derivatives when chlorine is used, brominated derivatives following ozonation treatment in the presence of bromine; these products are usually grouped under the term DBP "Disinfection By-Products").

Final chlorination is the least expensive technique, but some microorganisms such as *Cryptosporidium* are resistant to this treatment. Furthermore, this treatment is only recommended at the end of the treatment so as to avoid forming DBPs.

Ozonation raises the problem of residual elimination of this oxidant. Its action on *Cryptosporidium* cysts remains limited. Some DBPs may also be formed.

UV technologies are efficient due to the efficiency of radiation on the DNA of microorganisms, and on the RNA of viruses. The difficulty is to make sure that the entire liquid flow actually receives a minimum radiation dose. This problem is solved if there are no short circuits in the UV reactor. The dose is then calculated by the use of complex models taking account of the reactor geometry, the type of lamps, aging of the lamps, the liquid flow to be treated, and the characteristics of the liquid to be treated, particularly transmittance to radiation. These treatments are often the final step after elimination of suspended solids (MES) and turbidity.

The advantage of filtration membranes is to collect several functions depending on the breakdown threshold used; elimination of suspended solids, microorganisms, turbidity, dissolved compounds. In terms of a reduction in pathogenic organisms, membranes have best performances if the breakdown threshold is below micro-filtration. Nevertheless, risks of a new release of microorganisms are not strictly controlled, which is the reason why this method is not approved by the Ministry of Health. Filtration membrane integrity tests are compulsory to guard against this type of problems.

Unfortunately, the essential disadvantage of filtration membranes is their sensitivity to clogging, which normally involves initial preliminary treatments, or even several filtration steps in series with increasingly small pore sizes.

Systems involving pulsed electric fields (PEF) have been developed on a large scale by the development of electronic systems switching very high instantaneous powers, and with high reliability. New electronic systems developed in France by the Commissariat à l' Energie Atomique within a laser controlled uranium enrichment program (MOS cards) enable pulses shorter than one microsecond, with practically no frequency limitation.

The first usage domain is cold sterilisation of food. This technique avoids thermal degradation of food products. It is only applicable to pumpable products including fruit juice concentrates, egg whites, various liquids, etc.

In terms of "mass" treatment of industrial water, the use of this technique is mentioned as a means for preventing biological clogging (incrustation of molluscs in pipework) in nuclear power station heat exchangers. Nuclear power stations are concerned by the treatment of coolant system flows following the discovery of amoeba (Naegleria fowleri, Nf) in Nogent-sur-Seine power station in France.

These industrial systems are at the other end of the scale to laboratory micro-systems specialised in genetic manipulations that have existed for several decades and only treat a few millilitres.

The effects conventionally mentioned are poration effects and death of the cell by a "capacitor" effect due to the existence of a double insulating lipidic layer at the plasma membrane. Probable effects of molecular resonance are also mentioned, with a direct effect on the DNA of the nucleus. Some biological functions (synthesis of adenosine triphosphate—ATP, sodium pump) may be disturbed.

For a long time, it has been thought that it would be useful to associate a driving force not originating from mechanical energy, to compensate for the disadvantage of clogging of filtration membranes. This is the case for electrical energy. There are many examples of electrical effects associated with filtration. In general, a low direct voltage is used (less than 100 V), since methods are derived from electrolysis or membrane electrolysis. It may involve electrocoagulation in which the metal of electrodes (aluminium, iron) is solubilised and ionically associated with colloids to improve coagulation before filtration.

Electrofiltration in the presence of a surfactant is described as the superposition of an electric field onto a transmembrane pressure. The concentration polarisation is reduced, increasing performances in terms of flow by a factor of 10.

Chemical effects based on the production of hydrogen peroxide starting from dissolved atmospheric oxygen are observed with a titanium anode covered with $RuO_2$. This system, called electro-peroxidation, provides a means for oxidising chemical compounds, colloidal particles and even microorganisms. These effects would make it possible to reduce resistance to transfer at the filtration membrane/solution interface.

The technical literature mentions the case of pulsed electric fields/rotofermenter (MBR) coupling in a two-stage method. The purpose in the first stage (pulsed fields) is to destroy chlorinated compounds (mineralisation of chlorine) or phenolic compounds contained in an aerosol flow, in other words mostly gaseous rather than liquid.

The phenolic compounds pass through an intermediate aggregation step by polymerisation of the phenolic nucleus. This preliminary treatment accelerates the biodegradation rate and therefore the final efficiency of the MBR. Further information about this subject is given in the article entitled "Pulsed power for advanced wastewater remediation" by V. M Bystritskii et al., 11$^{th}$ International Pulsed Power conference, 1997, pages 79 to 84.

Coupling between pulsed fields and filtration is described for the treatment of treatment plant sludges. U.S. Pat. No. 6,030,538 mentions the possibility of reducing the water content from an initial content of 50% to a final value of 10 to 15%. The system combines induction heating, on line filtration (at a pressure of the order of 70 to 105 bars) and extrusion of dry sludge through calibrated orifices. The phenomenon described is a salt-out of intra-cellular liquid, which contributes to reducing the water content. Key parameters include the concentration of flocculent, the energy of pulsed fields and hydration of sludges. The method can be used in practice to obtain drier and biologically inert sludge to be spread.

Methods coupling pulsed electric fields and membrane filtration are particularly attractive for the following reasons.

The nature of the effects of pulsed fields on effluent may be biological (cell destruction), physical (increase in the size of compounds in solution) and chemical (mineralisation of chlorine).

A pulsed electric field will eventually be beneficial to subsequent filtration, due to its effect on:

small molecules by initiating radicalar reactions for degrading micropollutants and reducing the soluble COD, the colloidal fraction of a solution, characterised by surface charges and formed by more or less organised aggregates of molecules, macro-molecules and cellular debris, splitting of macro-molecules, encouraging enzyme exocellular hydrolysis reactions in order to reduce the production of sludges from biological sources, the release of endoplasmic molecules with a coagulating effect (polysaccharides), the destruction or inactivation of microorganisms by splitting of the cytoplasm or by direct action on the cellular nucleus.

PRESENTATION OF THE INVENTION

The invention was designed to provide a new method and a new installation for the treatment of effluents combining solid/liquid separation and pulsed electric fields, this new method and this new installation being easier to implement and more efficient than techniques according to prior art.

The method according to the invention is based on coupling of solid/liquid separation with pulsed electric fields.

The combination of biological, physical and chemical effects introduced by pulsed electric fields provides a means for reducing the cell population, making a salt-out of substances present in the cytoplasm and hydrolysis of macro-molecules. Under these conditions, and unexpectedly, the biological activity of microorganisms that were not destroyed is increased. Biological assimilation reactions are then accelerated, which results in an increase in the consumption rate of dissolved polluting substances. Furthermore, this increase in biological activity is accompanied by cannibalism between microorganisms which causes a global reduction in the biomass. Finally, the release of some endo-cellular compounds contributes to aggregating suspended solids and facilitates subsequent liquid/solid separation.

Therefore, the purpose of the invention is a method for the treatment of effluents in which a flow of the said effluents is subjected to a pulsed electric field that has the effect of modifying physicochemical and biologic characteristics, this modification being used during a solid/liquid separation operation, the solid/liquid separation and application of a pulsed electric field being operations carried out at different locations in the effluent flow, characterised in that the pulsed electric field is used according to a discharge mode, in other words a single acting mode, and has voltage value, current value, pulse repetition frequency and voltage front shape characteristics chosen such that the required effluent treatment is achieved as a function of the locations at which the operations for solid/liquid separation and the application of a pulsed electric field are carried out.

The pulsed electric field can also be used in a discharge and charge mode, in other words double acting.

The solid/liquid separation operation may be a membrane filtration operation (tangential filtration, frontal or semi-frontal filtration) or a settlement operation.

Advantageously, the said modification of physicochemical and biological characteristics enables hydrolysis of dissolved substances, aggregation of colloids, complete or partial destruction of microorganisms and simultaneous activation of remaining microorganisms.

The method according to the invention can be applied to the treatment of treatment plant effluents and sludges, either in an activated sludge reactor, or in a rotofermenter.

Another purpose of the invention is an effluent treatment installation including means for performing a solid/liquid separation on a flow of the said effluents, and means for applying a pulsed electric field to the flow of the said effluents, with the effect of modifying the physicochemical and biological characteristics exploited during the solid/liquid separation, means for separation of the solid/liquid and means for application of a pulsed electric field at different locations along the effluent flow, characterised in that means for applying a pulsed electric field are means operating according to a discharge mode, in other words a single acting mode, and with voltage value, current value, pulse repetition frequency and voltage front shape characteristics chosen such that the required effluent treatment can be achieved as a function of the locations at which these solid/liquid separation means are used and a pulsed electric field is applied.

Means for application of a pulsed electric field may operate equally well in discharge mode and in charge mode, in other words they are double acting.

Means for submitting the effluent flow to a solid/liquid separation may be membrane filtration means (tangential, frontal or semi-frontal filtration) or settlement means.

Advantageously, the modification of physicochemical and biological characteristics enables the hydrolysis of dissolved substances, the aggregation of colloids, complete or partial destruction of microorganisms and simultaneous activation of the remaining microorganisms.

BRIEF DESCRIPTION OF THE DRAWINGS

The invention will be better understood and other advantages and specific features will become clear after reading the following description given as a non-limitative example accompanied by the attached drawings among which.

DETAILED DESCRIPTION OF EMBODIMENTS OF THE INVENTION

Figure 1:
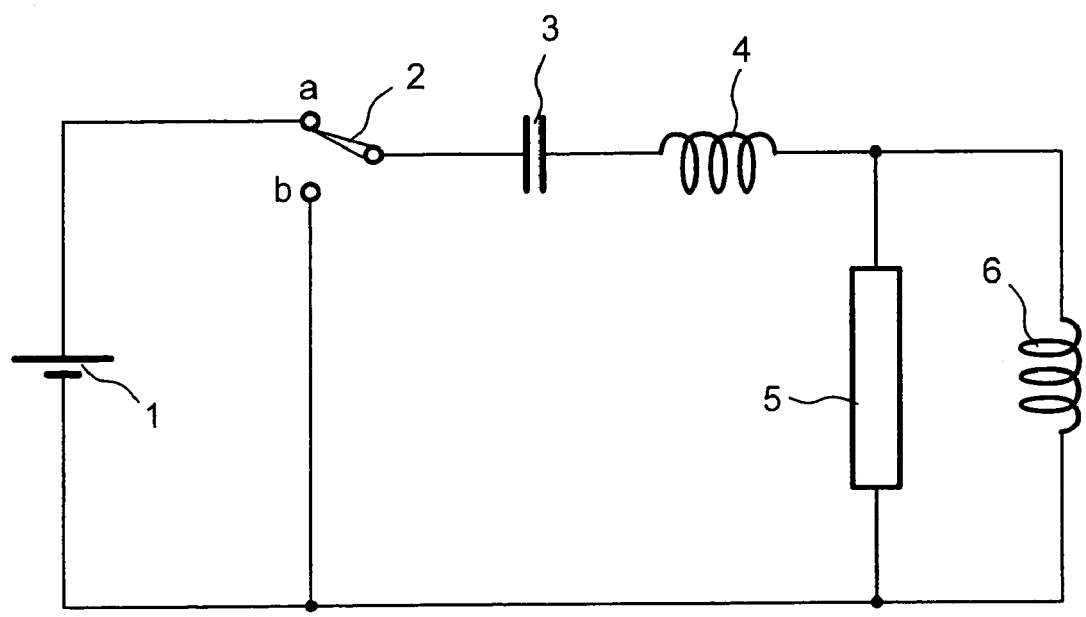
FIG. 1 is an electrical diagram of a circuit assigned to a single acting treatment head and that can be used by this invention,.

For example, the embodiments described below are applicable to a solid/liquid separation obtained by membrane.

Unlike the different electrofiltration (or electro-membrane) methods according to prior art, the "high potential" electrode used in this invention is not inside the filter membrane or is not composed of the separating membrane itself. This aspect simplifies application of the method. Standard commercially available membranes may be installed in a module without adding a conducting sheet facing them (plane or spiral membrane) and without an internal conducting nucleus (cylindrical membrane).

This is due to the fact that within the range in which they are used, the electric fields produce physicochemical and biological effects that have a sufficiently long duration to be beneficial for a few seconds or few minutes.

The amplitudes of the electric field are also much higher. In practice, the effects described in old electrofiltration methods are fairly similar to electrolysis phenomena in which the important parameter is generation of a strong electrical current at a low voltage. The number of electrons exchanged at the cathode is preponderant rather than the voltage that remains limited to values of a few tens or hundreds of volts. In the new proposed membrane/PEF method, it is important to have a high voltage (5 to 30 kV) in order to produce an intense electric field (5 to 100 kV/cm and preferably 10 to 50 kV/cm) in order to make the plasma membrane of the microorganisms split.

Finally, the pulse repetition frequency is also an overriding parameter: depending on the nature of molecules involved in clogging, the frequency of pulses can be adjusted to values for which a resonance phenomenon will deactivate the compound (or the family of compounds) in order to facilitate their passage into the "process" membrane and reduce internal clogging phenomena, particularly due to adsorption by electrostatic charge effects.

Finally, another important parameter is the shape of the voltage front: it is preferable to have systems in which the voltage rises almost instantaneously, unlike sinusoidal systems or when inductance effects are too noticeable.

The effect of wave fronts could be compared with a shock wave that could definitively deactivate the nucleus of a bacteria without splitting and salt-out of the endocellular compounds.

Judicious coupling of modulable PEF effects (voltage, current, frequency, wave front), and membrane separation effects provides a means for obtaining the required effluent treatment.

The value of the electrical voltage current, the shape of the wave front and the pulse repetition frequency can be given priority as required.

A high voltage can split cells and separate salted-out internal compounds or enable reuse of them later. It also provides a means for assuring complete destruction of microorganisms and preventing their proliferation in the form of a biofilm on the membrane surface.

The passage of a high current (in other words a large number of electrons) provides a means for transferring charges to charged colloids or compounds so as to neutralise them and then to cluster them and finally be able to separate them easily by steric segregation using tangential filtration membranes.

The wave front is important when bacteria or other pathogenic biological organisms are to be definitively deactivated by direct action on their nucleus and so that they can be retained on filtration membranes without any possible proliferation and without salt-out of metabolic compounds.

The pulse repetition frequency occurs as a result of electrokinetic effects related to the dipole moment of the plasma membrane. When electrokinetic forces are greater than cohesion forces of the double lipidic layer, this layer breaks and can cause splitting and then the death or microorganisms.

In all methods involving pulsed electric fields divulged in prior art, it appears that users are only concerned with the "simple discharge" effect through the treatment head, more precisely through the liquid stream to be treated. This is due to the fact that the best known effects consist of tending to cause cell splitting. Required instantaneous powers are very high, of the order of a few hundred MW for 1 μs.

Normally, passage of a charge current in the treatment head is limited by inserting an electrical element in parallel to the treatment head, for which the impedance will be zero under continuous conditions and high under transient conditions such as a pure inductance. FIG. 1 is the electrical diagram for a circuit assigned to a single acting treatment head. The circuit comprises a DC power supply 1 varying from 1 to 20 kV and capable of outputting a current of 2 to 50 A, a pulse switch 2 capable of switching from a position a to a position b, a capacitor 3 and a series inductance 4. The effluent treatment head constitutes a means for subjecting the flow of effluents to a pulsed electric field and is marked as reference 5. It comprises an inductance 6 connected in parallel. To charge, the switch 2 is on position a and the resistance 5 representing the treatment head is shunted by the presence of the pure inductance 6. To discharge, the switch 2 is on position b, and the high power switching system consisting of the capacitor 3 and the inductance 4 outputs a discharge with characteristics consisting of a voltage of 5 to 50 kV and a current of 500 to 2000 A for 1 μs.

Figure 2:
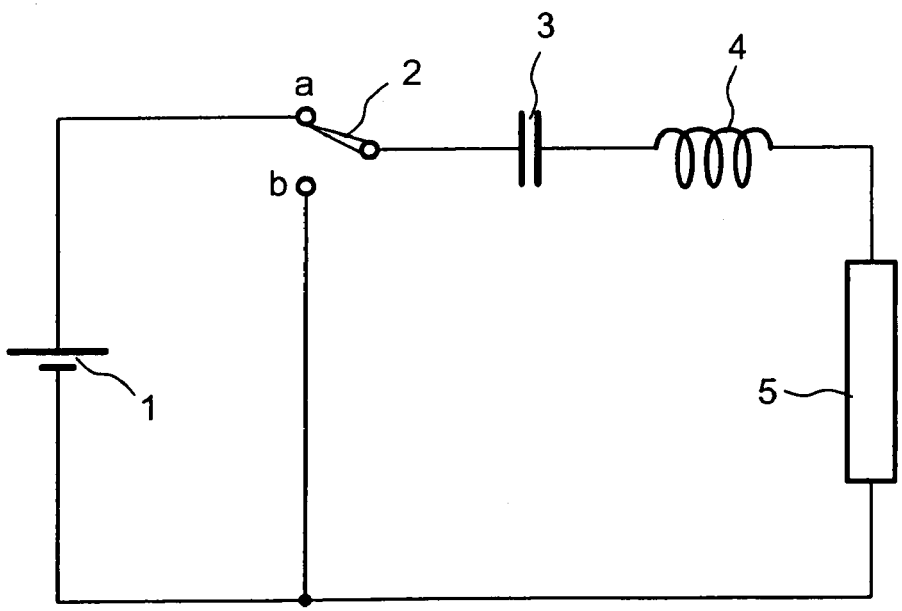
FIG. 2 is an electrical diagram of the circuit assigned to a double acting treatment head and that can be used by this invention.

In the prospect of membrane separation coupled to PEFs, the electrical effect could also be used beneficially during charging. For example, this may be done by choosing to pass a charge current in the treatment head. In this case, the treatment head is installed alone as shown in FIG. 2, which is the electrical diagram for a circuit assigned to a double acting treatment head. The charge time is usually of the order of several tens of μs, so that the resulting time necessary (colloidal aggregation) for transferring charges or transferring material can be respected. This time is longer than the transfer of electrons since the species (molecules, colloids) have to be renewed at the interface of the electrodes. Charge characteristics for the treatment head are a voltage of 1 to 20 kV and a current of 2 to 50 A. During the discharge, these characteristics are a voltage of 5 to 50 kV and a current of 500 to 2000 A.

The advantage of passing a current in the head while charging are to prevent polarisation of the electrodes and thus extend their life, and provide a means for transferring electrons that could aggregate colloids, thus facilitating trans-membrane flow during the filtration step.

On the other hand, shunting the treatment head during the charge will improve operating conditions at high frequency (the time between two pulses is shorter), consequently enabling the use of very steep voltage fronts.

In conclusion, the method according to the invention provides a means for doubling effects conventionally envisaged when using PEFs, these effects being used beneficially in the membrane separation step.

Passing a high current through a conducting medium is accompanied by a more of less localised and variable intensity magnetic field which could disturb electrical signals. This phenomenon is unexpectedly beneficial for biological or molecular purposes. The result is deactivation of specific biological compounds responsible for bonding of biological molecules to each other or responsible for intracellular bonding, and therefore bonding of the biofilm on the filtration membrane. Furthermore, other frequency values facilitate the passage of some molecules or ions through the filtration membrane, limiting their chemical activity and their propensity to form complex molecules that could be adsorbed in-depth on the pore wall.

The potential applications of pulsed electric fields coupled with membrane separation facilitated by the modification of physicochemical and biological characteristics of an aqueous medium occur in all applications for solid/liquid separation and the use of filtration membranes:

water treatment, reduction of the biofilm, reduction of internal clogging, biological decontamination;

treatment of effluents: reduction of external clogging, oxidation of micro-pollutants;

activated sludge reactors, on the input side of settlement, due to activation of microorganisms and reduction of the biomass quantity;

rotofermenters: preliminary hydrolysis step by splitting of macromolecules before filtration;

hygienisation of biological sludges: destruction/splitting of microorganisms and concentration by filtration membranes;

production of fruit juices: splitting of cellulose membranes (equivalent to the plasma membrane for plants), and separation by filtration of fibres and fragments of the vegetable cells;

destabilisation of water/oil suspensions or emulsions by increase in the size of droplets in the dispersed phase and easier separation in the two phases;

treatment of organic phases that are poor conductors of electricity (compared with aqueous phases; for example, vegetable, mineral or synthetic oils, or apolar organic solvents).

The difference in electrical characteristics of compounds in suspension and in solution is used to aggregate the most highly conducting compounds and facilitate coupled filtration.

Filtration according to the invention can cover different granges: microfiltration (particle sizes between 0.1 μm and 10 μm), ultrafiltration (molecule sizes between 0.005 μm and 0.1 μm), nanofiltration (molecule sizes between 0.001 μm and 0.005 μm), reverse osmosis (molecule sizes smaller than 0.001 μm). Unlike electromembrane methods, the driving force for these filtration types is the transfer pressure.

Pulsed electric fields cover the frequency range of the order of 1 Hz to 100 000 Hz, preferably from 1 Hz to 10 000 Hz. The electric field can vary from 1 kV/cm to 100 kV/cm, and preferably from 3 kV/cm to 50 kV/cm. The electrical effect may be repeated between 1 and 1000 times per second, and preferably between 1 and 100 times. Also, only part of the flow can be subjected to PEFs before filtration treatment.

Due to the fact that transformations of physicochemical and biological characteristics are long lasting, membrane/PEF coupling is done with a slight offset in time. PEFs can be applied between 0.1 and 1000 seconds before filtration, for example between 1 and 100 seconds. The time that elapses between the PEF treatment and filtration is due to the residence time t of effluents in the pipes that transport them, calculated based on the ratio of the volume V of the installation between PEF and membranes, and the supply flow Q to the membrane modules:

$$t=V/Q$$

Figure 3:
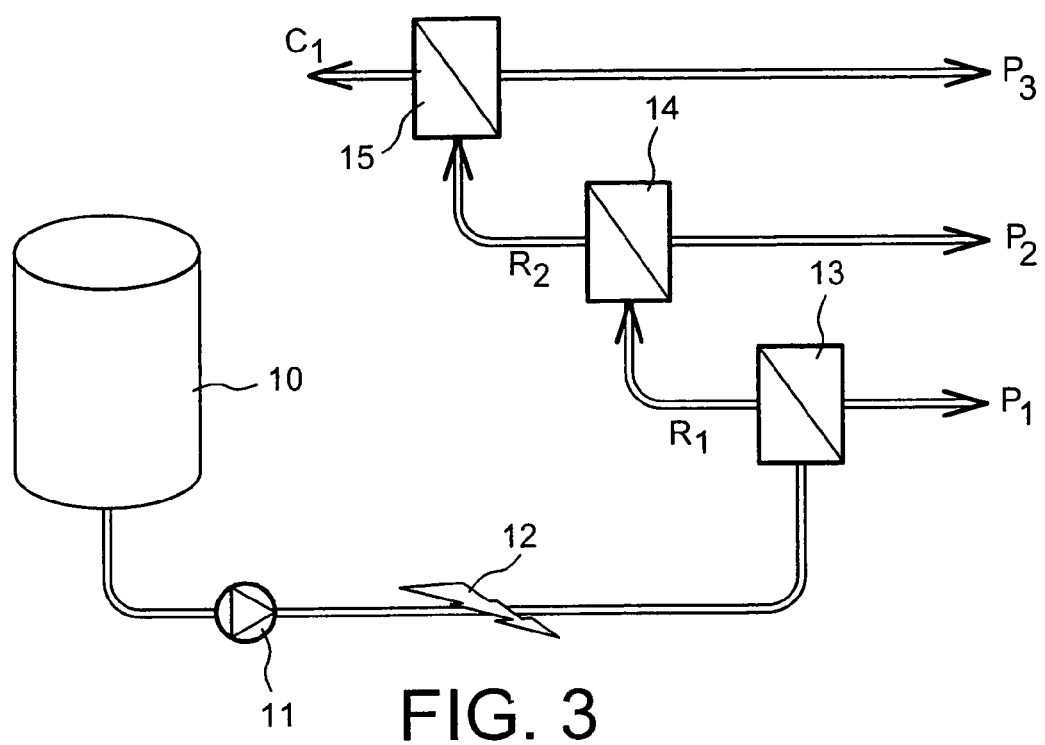
FIG. 3 is a diagram of an effluent treatment installation according to a first variant of this invention.

FIG. 3 is a diagram representing insertion of a PEF system on the input side of filtration on the effluent supply circuit. The effluents originate from a reservoir 10 and are supplied through a pipe to the treatment installation. A pump 11 at the output from the reservoir 10 pressurises the effluents and controls their circulation at a flow Q. The effluents are firstly subjected to pulsed electric fields output by a PEF device 12 before arriving at membrane systems 13, 14 and 15, which constitute a means for subjecting the flow of the effluents to a solid/liquid separation operation. The membrane system 13 outputs a first ultrafiltrate $P_1$ and a retentate $R_1$ to the membrane system 14. The membrane system 14 outputs a second ultrafiltrate $P_2$ and a retentate $R_2$ to the membrane system 15. The membrane system 15 outputs a third ultrafiltrate $P_3$ and a concentrate $C_1$.

Figure 4:
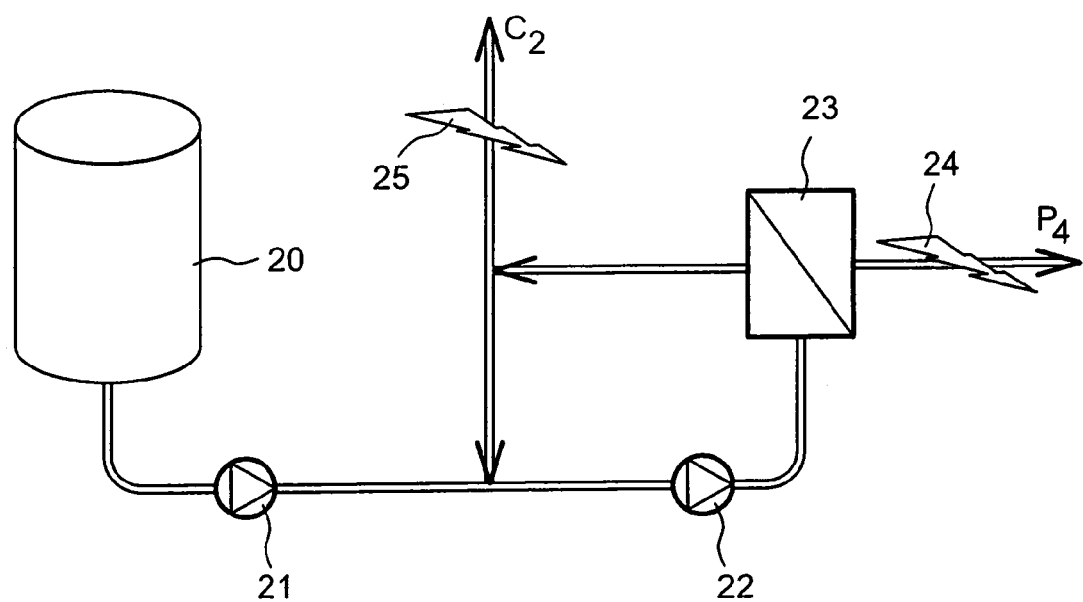
FIG. 4 is a diagram of an effluent treatment installation according to a second variant of this invention.

Coupling can also be done in the reverse order. The first step in the method is then filtration, the second step consisting of a treatment by PEF. This is illustrated in FIG. 4, in which a PEF system is inserted on the output side of filtration on the final ultrafiltrate (final disinfection) and on the concentrate (hygienisation of biological sludges). Effluents originate from a reservoir 20 and are supplied through a pressurisation pump 21 and a circulation pump 22 arranged in series, to a membrane system 23. The membrane system 23 outputs a ultrafiltrate $P_4$ after passing through a PEF device 24 and a retentate that is partially recirculated between pumps 21 and 22. The membrane system 23 also outputs a concentrate $C_2$ after passage in a PEF device 25. In this case, the essential objective is a final disinfectant effect after the filtration step, so that filtration membranes for which disinfection has not been approved can be used (cylindrical, spiral or plane membranes). Membranes with hollow fibres can also be coupled to PEF devices. In this case, the PEF treatment is applied indifferently to the concentrate or ultrafiltrate for hygienisation purposes.

Figure 5:
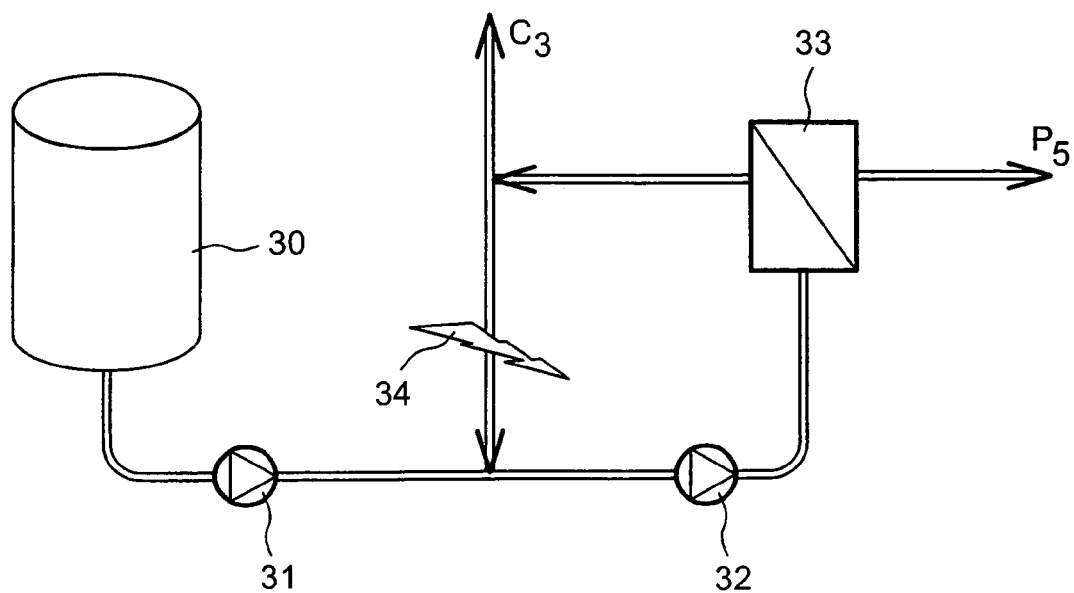
FIG. 5 is a diagram of an effluent treatment installation according to a third variant of this invention.

PEF and separation treatments can also be alternated, particularly in a tangential filtration loop in which the retentate conventionally circulates several times (in other words in loop) through the "process" membrane. This is illustrated in FIG. 5. The effluents originate from a reservoir 30 and are supplied through a pressurisation pump 31 and a circulation pump 32 arranged in series, to a membrane system 33. The membrane system 33 outputs a ultrafiltrate $P_5$ and a retentate that is partially put into circulation again between pumps 31 and 32 after passing through a PEF device 34. The membrane system 33 also outputs a concentrate $C_3$.

The electrodes of the PEF device may have normal geometries—plane, concentric, etc. The required effect is that the electric field should have sufficient values to deactivate the different species present and that hydraulic pressure losses should remain within acceptable values, considering the total energy cost.

A new method for treatment of water and effluents coupling filtration membrane technologies and pulsed electric fields (PEF) is disclosed in this presentation. The phenomena involved by PEFs help to modify the physicochemical and biological characteristics and this modification particularly enables reduction of membrane sludge clogging throughout the entire range of embodiments of the method in which the driving force is the pressure: microfiltration, ultrafiltration, nanofiltration and reverse osmosis. Due to the adjustable parameters of PEFs (intensity, voltage, frequency, wave front, etc.), these phenomena are potentially:

reduction of the biofilm (splitting and lysis or temporary deactivation of microorganisms),
partial destruction of microorganisms and simultaneous activation of the remaining microorganisms,
aggregation of colloids (transfer of electrical charges limiting electrostatic repulsion),
preliminary hydrolysis of macromolecules (by splitting of macromolecules),
oxidation of micropollutants (by formation of free radicals),
keeping "scale-forming" molecules in suspension.

Treatments of liquid food, drinking water, spring water, wastewater or even water treatment plant sludge are all potential applications of this new method.

The advantages provided by the invention include the lack of any serious electrolytic effects proven by the absence of any electrode wear. The surface condition of electrodes after about 200 hours of operation was studied using a Nanofocus AG apparatus. In particular, the value of the surface roughness confirmed that no modification had occurred during these 200 hours of operation. This result indicates that there was no chemical or electrochemical surface attack.

Another advantage resulting from the invention is the instantaneous and long-lasting activation of a population of microorganisms in the endogenous phase and deactivation of a population in the presence of a substrate. In both cases, cell mortality is due to lack of cell aftergrowth. This means that microorganisms have a metabolisation capacity throughout their individual life. Since the microorganisms remain living, they will continue to act in two different ways. They act firstly by excretion of metabolites facilitating solid—liquid separation. They also act by assimilation of dissolved exogenous compounds, causing a reduction in the effluent pollution level.

Tests were carried out in open circuit at 78 Hz (10 pulses per pass) or at 780 Hz (100 pulses per pass). The cell destruction rate was characterized using the numbering method on gelose. It is between 97.2 and 99.2% for the test at 78 Hz and is equal to 99.97% for the test at 780 Hz. A deactivation close to 4 Log is possible for energy values of the order of 10 kWh/m$^3$.

Cell activity was characterised using the respirometry method.

A test was carried out in recycling mode (at 78 Hz corresponding to 10 pulses per pass) in order to increase the number of treatments with time, to determine the effect of PEFs on a yeast suspension in the endogenous phase.

Figure 6:
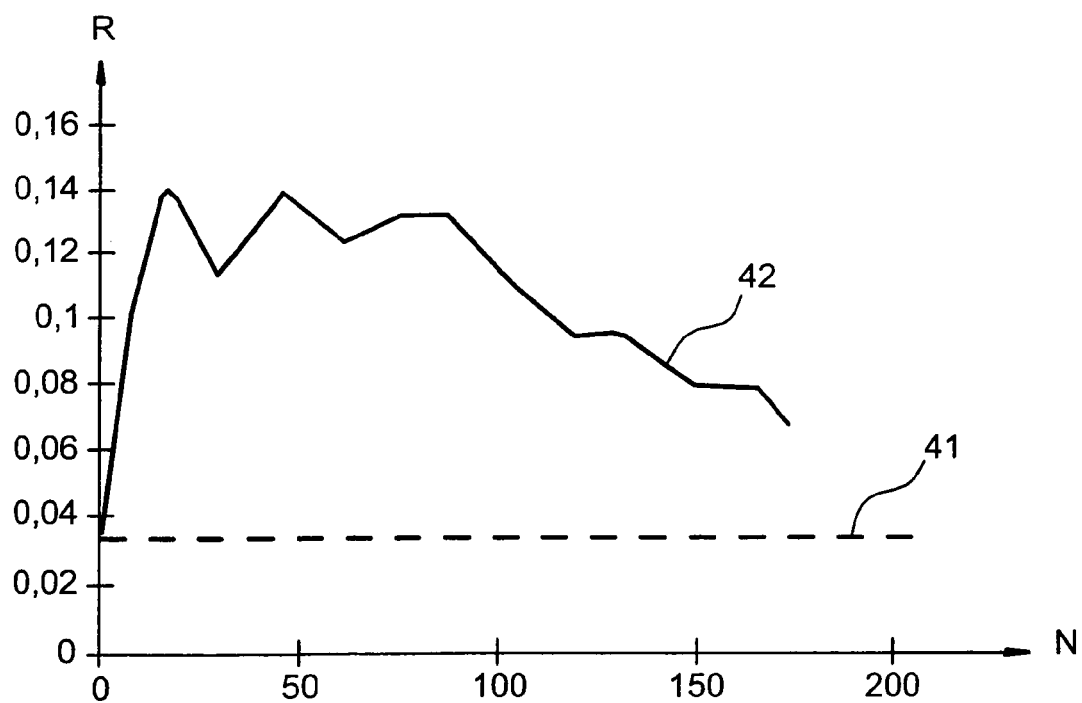
FIG. 6 is a diagram showing the variation with time of respiration of a biomass in the endogenous phase as a function of the increase in the number of pulses applied.

FIG. 6 is a diagram showing the variation of respiration R with time as a function of the number N of applied treatments. Respiration R is given in milligrams of oxygen per litre and per minute. The straight line 41 shown in dashed lines gives the value of respiration before treatment, in other words the value of the oxygen consumption rate in the endogenous phase. The curve 42 shows the variation of respiration with time.

It should be noted that respiration suddenly increases during the first treatments. The increase in respiration is of the order of 4 during the first 90 pulses. It reduces significantly afterwards, but it does not return to the initial value. The most plausible explanation is that the electrical shock applied to the yeast causes a salt-out of endoplasmic compounds into the medium (as proved by the increase in COD (chemical oxygen demand) in the medium which varies from 55 mg/l to 70 mg/l). Initially, undamaged yeast reabsorbs these compounds with the effect of increasing respiration. Later, the number of damaged or destroyed cells increases causing a reduction in the total biomass activity.

Therefore the most remarkable effect is the instantaneous and sudden activation of the biomass in the endogenous phase when it is subjected to an electric shock. Conversely, a population in the presence of a substrate is temporarily shocked but its metabolisation capacities are restored throughout its life. Nevertheless, in both cases, the reproduction capacity of the biomass originates solely from the fraction that was not shocked. There will be no aftergrowth in the shocked fraction (and fraction after lysis); this is clear whenever carrying out numbering tests on gelose.

The invention claimed is:

1. An installation for treatment of effluents, comprising:
   means for subjecting a flow of the effluents to a solid/liquid separation operation; and
   means for subjecting the flow of the effluents to a pulsed electric field that has an effect of modifying physicochemical and biologic characteristics, the modifying being used during a solid/liquid separation,
   the means for subjecting the flow of the effluents to the solid/liquid separation operation and the means for subjecting the flow of the effluents to the pulsed electric field being located at different locations along the effluent flow, wherein the means for subjecting the flow of the effluent to the pulsed electric field operates according to a discharge mode, the discharge mode being obtained by pulse discharge of a capacitor powered by a dc power supply, discharged through a load inductor and an inductor connected in parallel with said means for subjecting the flow of the effluents to a pulsed electric field for limiting a charge current applied to the effluents during pulse discharging of the capacitor.

2. An installation according to claim 1, wherein the means for subjecting the flow of the effluents to the pulsed electric field operates according to a charge and discharge mode, the charge mode being obtained by pulse charge of a capacitor powered by a dc power supply.

3. An installation according to claim 1, wherein the means for subjecting the effluent flow to the solid/liquid separation operation comprises membrane filtration means.

4. An installation according to claim 3, wherein the membrane filtration means is chosen from among tangential filtration, frontal filtration, and semi-frontal type filtration means.

5. An installation according to claim 1, wherein the pulsed electric field has characteristics adjusted so that the modifying of physicochemical and biological characteristics enables hydrolysis of dissolved substances, aggregation of colloids, complete or partial destruction of microorganisms, and simultaneous activation of remaining microorganisms.

6. An installation for treatment of effluents, comprising:
a solid/liquid separator located at a first location in an effluent flow stream and configured to subject a flow of the effluents to a solid/liquid separation operation; and
an effluent treatment unit located at a second location different than the first location and configured to subject the flow of the effluents to a pulsed electric field,
said effluent treatment unit including an effluent treatment head, a dc power supply, a capacitor powered by said dc power supply, a load inductor, and a switch configured to discharge the capacitor through the effluent treatment head and the load inductor in a discharge mode; and
an inductor connected in parallel with said effluent treatment head for limiting a charge current applied to the effluent treatment head during pulse discharging of the capacitor.

* * * * *

UNITED STATES PATENT AND TRADEMARK OFFICE
CERTIFICATE OF CORRECTION

| | | |
|---|---|---|
| PATENT NO. | : 7,381,328 B2 | Page 1 of 1 |
| APPLICATION NO. | : 10/517775 | |
| DATED | : June 3, 2008 | |
| INVENTOR(S) | : Schrive et al. | |

It is certified that error appears in the above-identified patent and that said Letters Patent is hereby corrected as shown below:

On the title page, Item (73), the Assignee information is incorrect. Item (73) should read:

Item -- (73) Assignee: Commissariat A l'Energie Atomique, Paris (FR) --

Signed and Sealed this

Fifth Day of August, 2008

JON W. DUDAS
*Director of the United States Patent and Trademark Office*